United States Patent [19]

Stumpe et al.

[11] Patent Number: 5,669,678
[45] Date of Patent: Sep. 23, 1997

[54] PROCESS AND APPARATUS FOR DETERMINING THE APPLICATION PRESSURES AND CHARACTERISTIC BRAKE VALUES OF A VEHICLE

[75] Inventors: Werner Stumpe, Stuttgart; Bernhard Schwendemann, Schorndorf; Matthias Horn, Hardheim, all of Germany

[73] Assignee: Robert Bosch GmbH, Stuttgart, Germany

[21] Appl. No.: 626,049

[22] Filed: Apr. 1, 1996

[30] Foreign Application Priority Data

May 13, 1995 [DE] Germany ............... 195 17 708.8

[51] Int. Cl.⁶ .................................................. B60T 13/66
[52] U.S. Cl. ................. 303/155; 303/113.4; 303/166; 303/3; 303/15
[58] Field of Search ................ 303/113.5, 113.4, 303/166, 155, DIG. 1–DIG. 4, 3, 15, 174

[56] References Cited

U.S. PATENT DOCUMENTS

| | | | |
|---|---|---|---|
| 4,327,414 | 4/1982 | Klein | 303/166 |
| 5,378,052 | 1/1995 | Yoshino | 303/155 |
| 5,443,306 | 8/1995 | Broome | 303/113.4 |
| 5,496,097 | 3/1996 | Eckert | 303/155 |
| 5,505,526 | 4/1996 | Michels | 303/155 |
| 5,511,863 | 4/1996 | Suh | 303/166 |

FOREIGN PATENT DOCUMENTS

| | | | |
|---|---|---|---|
| 616932 | 9/1994 | European Pat. Off. | 303/155 |
| 0697317 | 2/1996 | European Pat. Off. | |
| 3502051 | 7/1986 | Germany | 303/155 |
| 4210576 | 8/1993 | Germany | |
| 4424270 | 1/1996 | Germany | |

*Primary Examiner*—Matthew C. Graham
*Attorney, Agent, or Firm*—Felfe & Lynch

[57] ABSTRACT

During one or more braking processes, the application pressures of the wheel brakes and the characteristic brake values of the wheel brakes of at least one axle are determined. The application pressure represents the beginning of brake action at the wheels and can be determined from an inflection point in the curve representing brake pressure at the wheels as it increases in response to a driver's command, and further from the wheel velocity or a derivative thereof. The characteristic brake values are determined based on the brake pressure, the application pressure, and the deceleration of the vehicle. The application pressures and the characteristic brake values are stored for use in subsequent brake actions, in order to control the brakes so that wheels at each axle are uniformly braked.

11 Claims, 3 Drawing Sheets

PROCESS AND APPARATUS FOR DETERMINING THE APPLICATION PRESSURES AND CHARACTERISTIC BRAKE VALUES OF A VEHICLE

BACKGROUND OF THE INVENTION

The invention pertains to a process and apparatus for controlling the brake system of a vehicle based on driver's input and characteristic brake values determined from the operating parameters of the vehicle and the brake system during braking.

Especially in the case of combination vehicles consisting of a tractor vehicle and at least one braked trailer, it is desirable for the purpose of improving the braking process to minimize the longitudinal forces which occur between the tractor and the trailer during the braking process. These forces are at a minimum when the deceleration of the tractor vehicle and those of the individual trailers are approximately the same. An electrically controlled brake system can achieve this, but the values specific to the individual brakes for the onset of the braking action and certain characteristics of the brakes should be known. The electrical system which controls the brakes can then take these values into account when it determines the braking force.

A process for identifying brake characteristics in electrically controlled brake systems is known from DE 42 10 576 C1.

In this process, the braking characteristics of the wheel brakes of the individual axles of a combination vehicle are calculated over the course of at least three measurement time intervals during a braking process, each time with a different brake pressure distribution, the calculations being based on the effective brake pressure (measured brake pressure minus the application pressure) and the associated deceleration of the vehicle. In addition to the relatively complicated procedure for determining the brake characteristics on the basis of different brake force distributions in one braking process, no provisions are made for determining the application pressure.

Many different solutions are to be found in the state of the art for determining the onset of the braking action (application pressure) of a braking device. According to DE 44 24 270, to which U.S. application Ser. No. 08/596,259 corresponds, the time at which the brake device is applied is determined; and from that, the onset of the braking action, preferably the pressure applied to the braking device, is determined from the behavior of the rotational velocity of the wheels. When the brake device is applied, the change over time in the rotational velocity shows a characteristic type of behavior as a result of the onset of the braking action. The velocity signal itself has an inflection, while its first derivative with respect to time experiences an abrupt discontinuity, and the second derivative with respect to time forms an extreme value. This behavior is exploited to detect the time at which the braking action begins.

A method for detecting the onset of the braking action from the change over time in the pressure during the actuation of the brake is known from DE 41 12 845. Here the increase in pressure over time during a brake actuation is detected, and when an inflection is recognized, an application pressure value for the brake device in question derived from the brake pressure then prevailing is stored. The state of the art for determining the onset of the braking action does not describe any measures for determining a brake characteristic.

SUMMARY OF THE INVENTION

It is the task of the invention to provide a procedure by means of which, during a braking process, the values for the onset of the braking action (the application pressure) and certain brake characteristics for at least one axle can be determined.

The process according to the invention makes it possible to determine the onset of the braking action and the brake characteristic during the course of a braking process.

It is especially advantageous to wait for a braking process which is suitable for the determination of the onset of the braking action and/or for the determination of the brake characteristic to occur, or a braking process can be carried out while intentionally influencing and "detuning" the actuation of the brakes.

To detect the onset of the braking action, several methods are combined. Specifically, recognition is derived from the behavior of the rotational velocity over time and from the behavior of the brake actuation process (braking pressure, braking force, braking moment). The effect of using a combination of methods is therefore to increase the reliability and accuracy with which the onset of the braking action is detected.

The interference with the results and their scatter are reduced by identifying the braking characteristic on an axle-by-axle basis. The evaluation of essentially static data reduces the amount of computing work required.

The values thus determined are used advantageously to improve the functioning of the brake system, especially in conjunction with the control of the coupling force in combination vehicles. Through the detection of the onset of the braking action as the brake is being applied and through the detection of the end of the braking action as the brake is being released, the hysteresis of the brake system can be determined, and in this way the functionality of the system can be improved even more.

DESCRIPTION OF THE EXEMPLARY EMBODIMENTS

Figure 1:
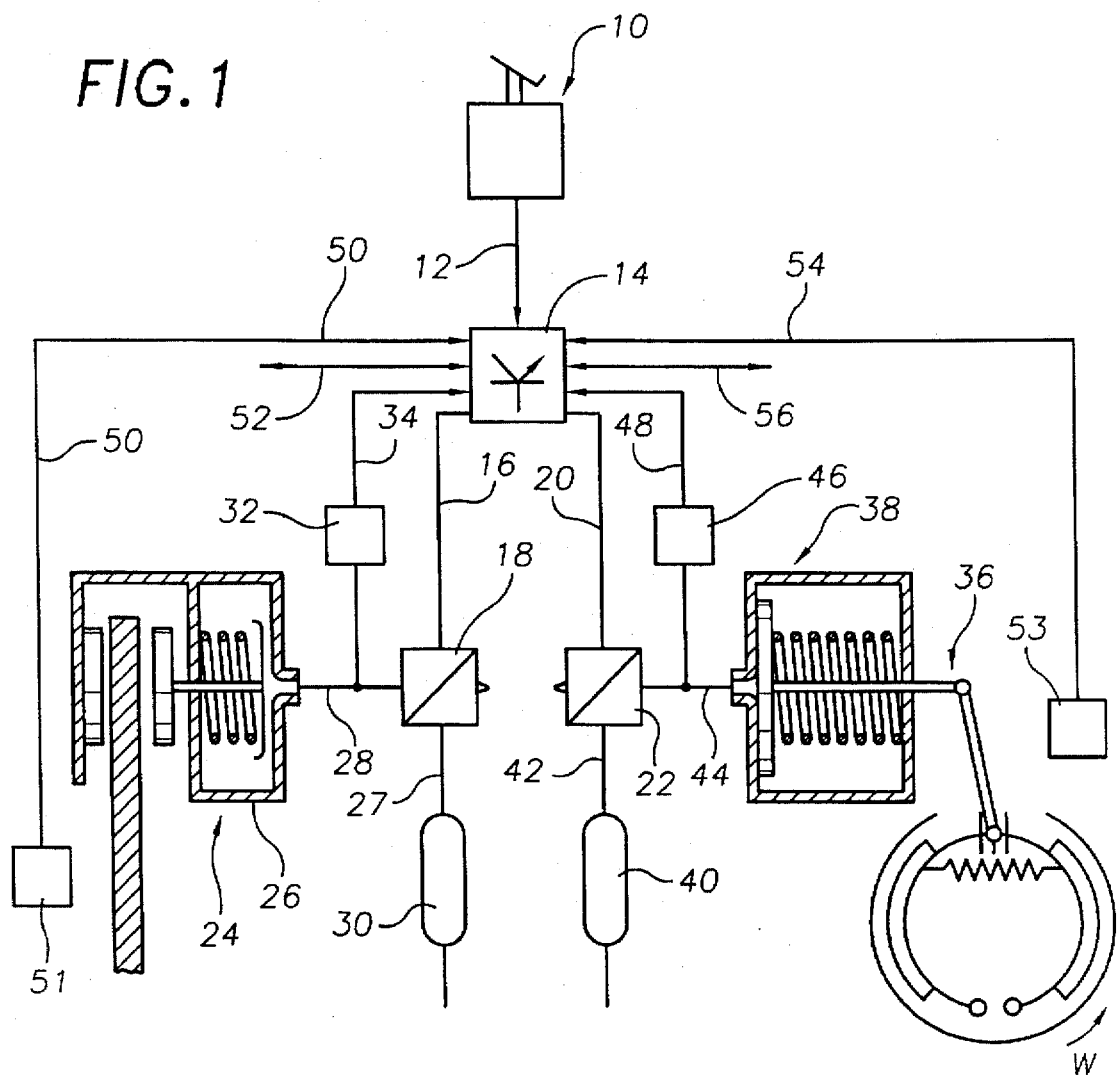
FIG. 1 is a block circuit diagram of an electrically controlled brake system in a preferred application example of an electro-pneumatic brake system.

FIG. 1 shows an overall circuit diagram of a brake system with electronic open-loop/closed-loop control. In a preferred exemplary embodiment, the brake system includes emergency or auxiliary brake circuits of a pneumatic or hydraulic nature, which are not shown in FIG. 1 for the sake of simplicity. In FIG. 1, a brake value transducer 10, which can be actuated by the driver, is shown, this sensor being connected by a line 12 to an electronic control unit 14. Electronic control unit 14 is connected by a line 16 to a first pressure control valve 18 and by a line 20 to a second pressure control valve 22. In a preferred exemplary embodiment, pressure control valve 18 controls the pressure being fed from a supply tank 30 to a brake cylinder 26 of a disk brake 24, the pressure passing through pressure control valve 18 and a hydraulic or pneumatic line 28. The pressure in line 28 and thus the brake pressure is detected by a pressure sensor 32, which is connected by a line 34 to electronic control unit 14. Electronic control unit 14 is connected by line 50 to a rotational velocity sensor 51, which measures the rotational velocity of the wheel assigned to brake 24. In a similar manner, pressure control valve 22 feeds the specified pressure from a supply tank 40 to brake cylinder 38 of a drum brake 36 by way of pneumatic or hydraulic lines 42, 44. A pressure sensor 46 detects the pressure in line 44. Pressure sensor 46 is connected by a line 48 to electronic control unit 14. To detect the rotational velocity of the wheel assigned to brake 36, a rotational velocity sensor 53 is provided, which is connected by a line 54 to electronic control unit 14. Additional output and input lines 52, 56 are also connected to electronic control unit 14; the operating parameters of the vehicle or of the brake system are transmitted to the control unit over these lines, and/or the electronic control unit sends its signals over them to control the brakes of other wheels or other axles.

The design of the brake system with both disk and drum brakes described above is an example. In other exemplary embodiments, the brake system in question can be equipped with either disk or drum brakes exclusively. In one exemplary embodiment, the pressure control valves are assigned to the axles of the vehicle axle; in other embodiments, they are assigned to the brakes of the individual wheels. In addition, it is possible to provide a purely electrical brake system instead of an electro-pneumatic or electro-hydraulic brake system. It is also possible to integrate part of electronic control unit 14 and/or of pressure sensors 32, 46 into pressure control valves 18, 22. Pressure control valves 18, 22 will then communicate with electronic control unit 14 via a data bus.

To initiate a braking process, the driver actuates brake value transducer 10. This converts the actuation value or the actuating force into an electric signal, which is sent to electronic control unit 14. If the actuation value of the brake value transducer exceeds a predetermined threshold, the intention to brake is assumed, and the pressure control valves are actuated by electronic control unit 14. In the case of a pneumatic brake system, these valves feed the required amount of air from supply tanks 30, 40 to brake cylinders 26, 38. The brake pressure level thus reached is also monitored by pressure sensors 32, 46, and the pressure value which has been produced is transmitted to electronic control unit 14. If this pressure is higher than that originally specified by the driver, pressure-reducing pulses are transmitted by the control unit. As a result of the pressure which has been produced, the brake cylinders close the friction brakes, and the braking moment thus produced reduces the rotational velocity of the associated wheel. As a result, the vehicle slows down. The strategy according to which electronic control unit 14 adjusts the feed of pressure to the brake cylinders can assume different forms. In the preferred exemplary embodiment, the pressure being supplied to the brake cylinders is controlled by way of feedback with respect to a predetermined nominal pressure value. In other advantageous exemplary embodiments, electronic control unit 14 can adjust the braking force, the vehicle deceleration, etc., to match a predetermined nominal value. In feedback control systems of this type, the nominal value in question (deceleration, braking pressure, braking moment) is determined as a function of the degree of actuation of brake value transducer 10 by the use of predetermined characteristic curves or fields. In addition, the coupling force between a tractor vehicle and a trailer, the axle loads, the temperature of the brakes, the frictional locking or slippage between the wheels of the vehicle and the pavement, etc., can also be taken into account in the controlled feed of pressure. Feedback control systems of this type are known in the state of the art.

Especially in the case of combination vehicles, it is necessary, as a way of minimizing the longitudinal forces, that the electronic brake control system apply the braking force to the brakes of all the wheels in such a way that the tractor vehicle and the trailer are decelerated to approximately the same degree. In particular, it is necessary to avoid temporary differences in the onset of the braking action at the various individual wheel brakes and also to avoid pronounced differences in the amount of braking force actually produced at the individual wheel brakes. For this reason, it is necessary to determine the braking pressure which characterizes the onset of the braking action at the individual wheel brakes and also the braking characteristics of the wheel brakes. The application pressures and brake characteristics thus determined for the individual wheel brakes are then taken into account in the determination of the braking pressure to be supplied in a controlled manner on the basis of the driver's command.

According to the process of the invention, the application pressure is determined from the change over time in the braking pressure signal and from the change over time in the rotational velocity signal. The corresponding procedure is explained on the basis of the time diagrams of FIGS. 2 and 3.

Figure 2:
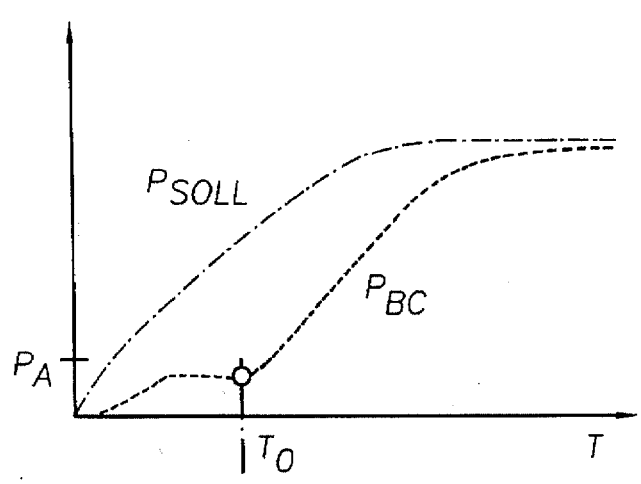
FIG. 2 is a plot of brake pressure versus time.
Figure 3:
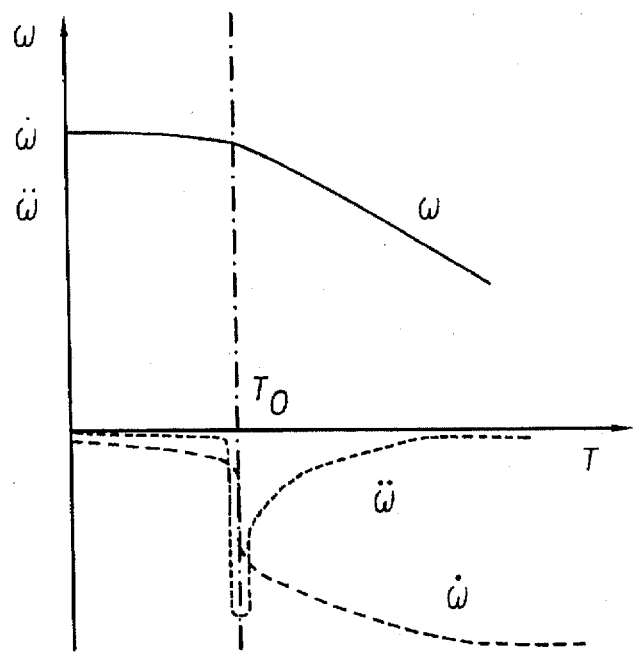
FIG. 3 is a plot of wheel rotational velocity, acceleration, and jerk versus time, and with FIG. 2 explains the measures used to detect the application pressure.

FIG. 2 shows characteristic curves for the braking command $P_{soll}$ (dash-dot line) and for the pressure in the brake cylinder $P_{Bc}$ (dotted line). FIG. 3 shows the change over time in the rotational velocity of the wheel (solid line), it first derivative with respect to time (dashed line), and its second derivative with respect to time (dotted line). The first derivative of the rotational velocity of the wheel with respect to time represents here the rotational acceleration, while the second derivative of the rotational velocity with respect to time represents the jerk induced by the application of the brake.

The rate at which the pressure increases depends essentially on the actuation of the nominal value transducer. When the brake pedal is first depressed, the brake cylinder still has no pressure. Then, however, air flows quickly from the supply tank to the brake cylinder because of the high pressure gradient. The air entering the brake cylinder is compressed until it reaches the level which corresponds to the resistances acting on the piston of the brake cylinder piston. The piston is thus pushed out as the brake actuating mechanism overcomes the air gap of the brake. During this phase, the outward travel of the piston is accompanied by an increase in volume but not by a significant change in pressure. The pressure medium continues to flow into the brake cylinder even after the friction brake has made contact. The braking pressure thus increases further. When the friction brake makes contact ($T_0$), therefore, an inflection occurs in the pressure curve. With respect to the rotational velocity of the wheel, a sudden dip in velocity occurs when the brake is applied at time $T_0$. The first derivative of the rotational velocity with respect to time shows a characteristic, discontinuous form, whereas the second derivative with respect to time shows a maximum at point $T_0$. The evaluation of the velocity curve and possibly of the derivatives with respect to time and the inflection in the pressure curve make it possible to arrive at an exact determination of time $T_0$, i.e., the time at which the brake in question makes contact. The application pressure $P_A$ is then derived from the pressure and braking action at the wheel begins in brake cylinder present at time $T_0$.

A similar process occurs when the brake is released.

When the brake is actuated, the actuating speed of the brake pedal is a major factor in the determination of the application pressure. The conditions for the actuating speed must therefore be specified in advance, so that the application pressure will be evaluated and determined only when the actuating speeds are suitable.

Figure 4:
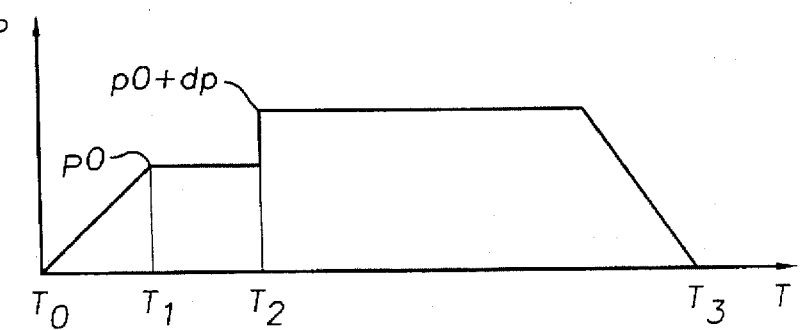
FIG. 4 shows by way of example a time diagram of the process for determining the application pressure and the brake characteristic.
Figure 5:
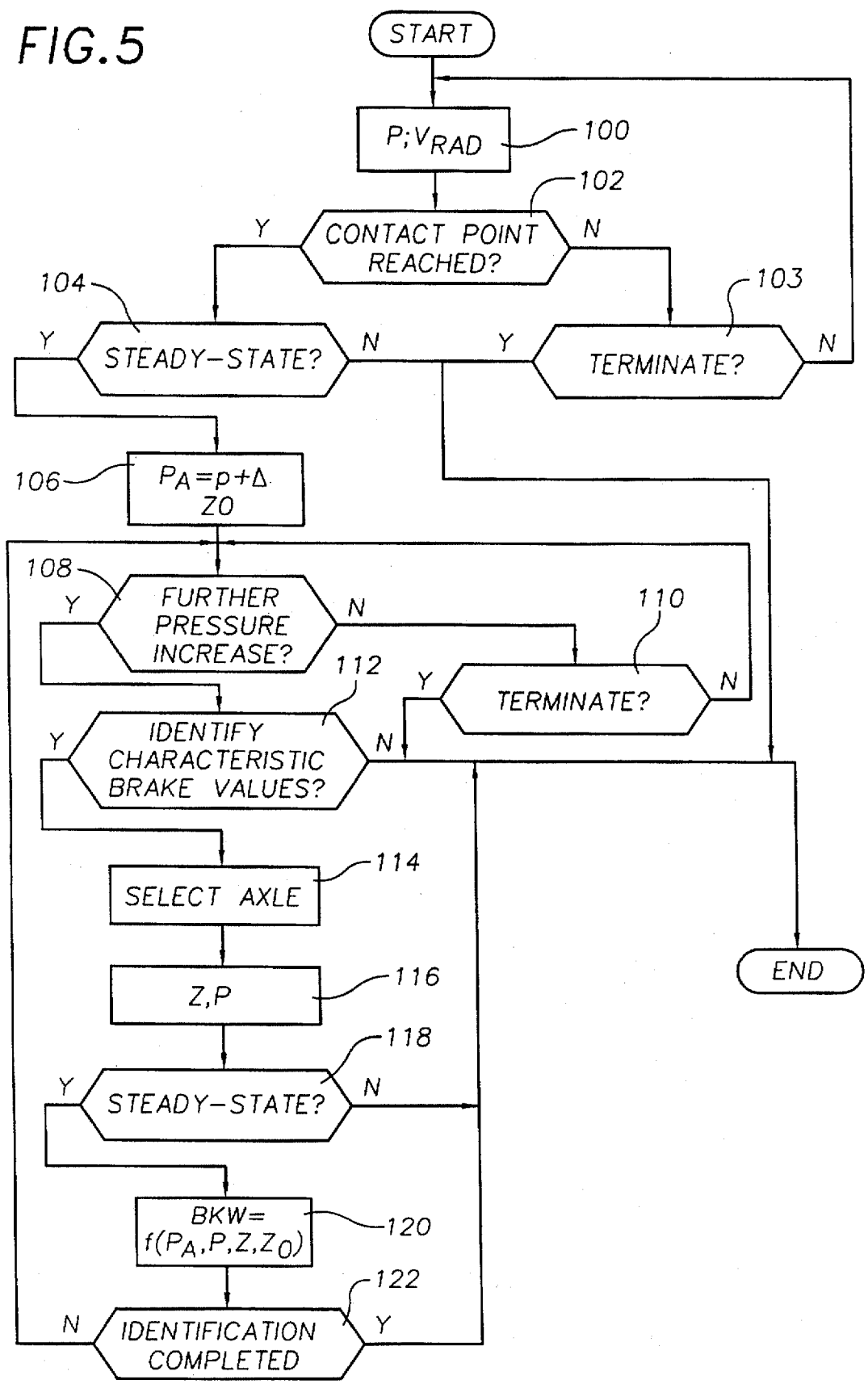
FIG. 5 illustrates the process steps as a computer program.

The procedure for identifying a characteristic brake value is illustrated in conjunction with the description of FIGS. 4 and 5.

The time diagram according to FIG. 4 is a schematic diagram of a braking process intended to illustrate the principle of the procedure for detecting the application pressure and for identifying the characteristic brake value for an axle of a vehicle. The pressure curve shown here is obtained either as a result of an appropriate braking process or as a result of sending intentional commands to the wheel brakes during a suitable braking process. In the preferred exemplary embodiment, the application pressure is detected and the characteristic brake value identified only when a suitable driver command curve is present. In other advantageous exemplary embodiments, this pressure curve is generated arbitrarily during a suitable braking process.

At the beginning of the braking process, the brake pressure is increased by the electronic control unit to a suitable pressure $P_0$. From the change over time in the brake pressure and in the wheel velocity or a derivative of the wheel velocity, the contact point and thus the application pressure $P_A$ at time $T_0$ are derived during the process of the controlled buildup of pressure. Between times $T_1$ and $T_2$ there is a short phase of static conditions, during which the contact pressures of the individual wheel brakes are determined and the values thus found are stored. Starting from time $T_2$, as the braking process continues, the brake pressure at a selected axle increases. After time $T_2$, short periods of static values occur again, so that, on the basis of the difference between the brake pressures and the decelerations at times $T_1$ and $T_2$, it is possible to determine a characteristic brake value by finding the equilibrium of forces between the braking force and the inertial force of the vehicle. The procedure presented here therefore makes it possible to identify the application pressure and the characteristic brake value of wheel or axle during a braking process. The required pressure curve can be produced for the purpose of identification, or a suitable one can be provided by the driver. This latter case occurs when, for example, the driver brakes the vehicle gently at first (so that the application pressure can be detected) and then more strongly. For the purpose of identification in this process, either the braking action at the individual brakes is built up in a staggered manner, or the brake pressure distribution between the axles is varied. The characteristic brake value for the axle at which the pressure was increased is then calculated from the change in the brake pressure and the change in the deceleration by comparison with the previous steady state.

In another advantageous exemplary embodiment, the axle to be identified is intentionally "detuned" during the braking process; that is, the brake pressure on this axle or on this wheel is increased by a predetermined value, and the characteristic brake value is derived. The brake pressures on the other axles are kept constant during this process. The procedure is repeated in a similar manner for the other axles in succession.

FIG. 5 shows a flow chart which offers information on a realization of the procedure according to the invention in the form of a computer program. The program section illustrated in FIG. 5 is initiated in the preferred exemplary embodiment at predetermined times during an operating cycle of the motor vehicle. Upon successful identification of application pressures and characteristic brake values, the program is not activated again, at least for the current operating cycle of the motor vehicle. The diagram is limited to the example of only one wheel brake for the sake of simplicity. The application pressures of the other wheel brakes are determined by similar sections of the program.

The section of the program shown begins at given times with the beginning of a braking process. Brake pressure P and the rotational velocity $V_{rad}$ of the wheel are accepted as input in step 100. On the basis of the change over time in the brake pressure and in the wheel velocity, the system checks to see in step 102 whether the "contact" point has been reached, i.e., whether braking action at the wheel has begun. For this purpose, in the simplest case, the difference is formed between the current pressure and velocity measurement values and the measurement values stored on an interim basis during the preceding run of the program; this difference is then compared with that calculated in the preceding run of the program. If characteristic deviations are found, conclusions are drawn concerning the inflection behavior of the pressure curve and the velocity curve shown in FIGS. 2 and 3. If it is possible to conclude that there is no inflection in the pressure curve or in the velocity curve, the system checks in step 103 to see whether or not the identification process should be discontinued. This can be the case when, for example, a predetermined period of time has elapsed; when the braking process has been terminated; or when a sudden, rapid actuation of the brake pedal has occurred. In this case, this section of the program is ended; otherwise, it begins again with step 100 to continue the identification process. If an inflection was detected in both signals (possibly also during the course of different runs of the program fairly close together in time), then it is concluded that the brake has made contact. Thereupon, in question step 104, the system checks to see whether a steady state has been reached and in particular to see whether the deceleration of the vehicle is constant. If this is not the case, this section of the program is discontinued, and the identification process is broken off. If, however, in step 104, a steady operating state has been recognized, then, in the following step 106, application pressure $P_A$ is stored on the basis of current brake pressure and a tolerance value $\Delta$; in addition, the vehicle deceleration $Z_O$ at this time is also stored. Thereupon, the system checks in step 108 to see whether the driver desires the pressure to be built up any further. If this is not the case, the system checks in step 110 to see if the break-off condition is present. If it is not, the program section is repeated at a specified time with step 108; otherwise it is terminated.

If the driver wants to increase the pressure even further, the system checks in question step 112 to see whether or not it is possible to identify the characteristic brake values. This is the case primarily when the driver desires to increase the braking action only slightly. If no identification of the characteristic brake values is to be carried out, the program section is ended. To identify the characteristic brake values, in step 114 a first axle is selected, and the pressure build-up desired by the driver is carried out there. Thereupon, in step 116, vehicle deceleration Z and brake pressure P are detected; in question step 118, the system checks to see whether a steady operating state is present. This is the case primarily when the deceleration of the vehicle has not changed. If a steady operating state is not present, the program section is discontinued, and the identification of the application pressure and the characteristic brake value is broken off. In the opposite case, the characteristic brake value BKW of the axle on which the pressure is acting is, according to step 120, calculated from the application pressure $P_A$, the brake pressure P, and the decelerations Z and $Z_O$ or the mean values for the axles in question. This is done according to $BKW=G(Z-Z_O)/(P-P_A)$, where G is the weight of the vehicle. Thereupon the system checks in step 122 to see whether the identification has been concluded successfully. If this is the case, the program section is ended; otherwise, the program goes back to step 108. In the subsequent run of the program, the brake pressure is increased at another axle when the driver wishes to brake the vehicle again.

As described above, BKW represents the slope of the force/pressure curve, and $P_A$ represents the offset of this curve. If BKW and $P_A$ are known, the brake pressure necessary to generate a predetermined braking force can be calculated. On the other hand the weight (normal force) of the vehicle is known from the axle load signal. To optimize a braking process, the quotient of braking force and normal force at each axle should be the same. If this is the case, longitudinal forces are minimized. When BKW and $P_A$ are known, the brake pressure can be calculated at each wheel or axle to get the same quotient at each wheel or axle.

In a preferred exemplary embodiment, the application pressures $P_A$ and the characteristic brake BKW are determined during a braking process. If no brake process has been found suitable for identification, then according to the invention the identification is carried out arbitrarily according to FIG. 4. For this purpose, when the brake is actuated, first the pressure is increased in linear fashion until a pressure $P_0$ is reached. After the pressure $P_0$ has been reached, the pressure is kept steady for a predetermined period of time. Then the pressure on one axle is increased while being kept constant on all the others. After a certain steady-state period, this procedure is carried out successively on all the other axles, so that, from the parameters with respect to deceleration and brake pressure then available, the application pressures $P_A$ and the characteristic brake values BKW can be determined. A suitable braking process, during which the application pressure detection and the characteristic brake value determination are carried out, is characterized by a brake command of small value, which is in effect for a certain period of time with little or no change.

The process described above is used both during the buildup of the pressure and also during the release of the pressure; that is, the contact and release behavior of the brakes of the brake can both be determined.

What is claimed is:

1. Process for electronic control of a brake system of a vehicle, said vehicle having wheels and brakes at each wheel which are responsive to a driver's input, said process comprising monitoring said driver's input, monitoring at least one operating parameter, which increases in response to said driver's input, determining the vehicle deceleration, determining when braking action at each wheel begins, determining said at least one operating parameter when braking action at each wheel begins, determining a characteristic brake value as a function of said at least one operating parameter and said vehicle deceleration, storing said characteristic brake values and said at least one operating parameter determined when said braking action at each wheel begins, and controlling the brakes based on driver's input, said stored characteristic brake values, and said at least one stored operating parameter determined when braking action at each wheel begins.

2. Process as in claim 1 wherein the characteristic brake value is determined as a function of the at least one operating parameter when braking action begins, and the operating parameter after braking action begins.

3. Process as in claim 1 further comprising determining the wheel velocity for each wheel, the beginning of braking action being determined based on the change over time in the wheel velocity and the change over time in the at least one operating parameter at each wheel.

4. Process as in claim 3 wherein the beginning of braking action is determined when both the at least one operating parameter and the wheel velocity have a characteristic time curve.

5. Process as in claim 1 wherein said characteristic brake value is determined as a function of said at least one operating parameter, said operating parameter when braking action begins, said vehicle deceleration, and said vehicle deceleration when braking action begins.

6. Process as in claim 1 wherein said characteristic brake value is determined after determining when braking action begins.

7. Process as in claim 1 wherein the beginning of braking action and the characteristic brake values are determined based during a build-up in brake pressure effected by the driver.

8. Process as in claim 1 wherein the braking force is built up until it is determined that braking action begins, whereupon said braking force is not further increased until a specified time has elapsed, whereupon said characteristic braking value is determined as said operating parameter further increases.

9. Process as in claim 1 wherein said operating parameter is brake pressure, and said at least one operating parameter when braking action begins is the application pressure.

10. Process for electronic control of a brake system of a vehicle, said vehicle having wheels and brakes at each wheel which are responsive to a driver's input, said process comprising monitoring said driver's input, monitoring at least one parameter, which decreases in response to said driver's input, determining the vehicle deceleration, determining when braking action at each wheel ends, determining a characteristic brake value as a function of said at least one operating parameter and said vehicle deceleration, storing said characteristic brake values and said at least one operating parameters determined when braking action at each wheel ends, controlling the brakes based on said driver's input, said stored characteristic brake values, and said at least one stored operating parameter determined when braking action at each wheel ends.

11. Apparatus for control of a brake system of a motor vehicle, said vehicle having wheels and brakes at each wheel which are responsive to a driver's input, said apparatus comprising means for increasing and decreasing an operating parameter of the vehicle as a function of said driver's input, means for determining at least one of a beginning of braking action during increase of said operating parameter and an end of braking action during a decrease of said operating parameter, means for determining a characteristic brake value during said at least one of said increase and decrease of said operating parameter, and means for controlling the brakes based on said driver's input, said characteristic brake values, and at least one of said beginning of braking action and said end of braking action.

* * * * *

UNITED STATES PATENT AND TRADEMARK OFFICE
CERTIFICATE OF CORRECTION

PATENT NO. : 5,669,678
DATED : September 23, 1997
INVENTOR(S) : Stumpe et al.

It is certified that error appears in the above-indentified patent and that said Letters Patent is hereby corrected as shown below:

In column 4, line 55, after "contact" add -- and braking action at the wheel begins --.

In column 4, lines 56-57, delete "and braking action at the wheel begins" and replace with -- $P_{BC}$ --.

In column 7, line 9, after "brake" add -- values --.

Signed and Sealed this

Twenty-eighth Day of September, 1999

Attest:

Q. TODD DICKINSON

Attesting Officer

Acting Commissioner of Patents and Trademarks